United States Patent
Jarrar et al.

(10) Patent No.: US 8,624,627 B1
(45) Date of Patent: Jan. 7, 2014

(54) METHOD AND DEVICE FOR LOW POWER CONTROL

(75) Inventors: Anis M. Jarrar, Austin, TX (US);
William C. Moyer, Dripping Springs, TX (US); Jim C. Nash, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/538,200

(22) Filed: Jun. 29, 2012

(51) Int. Cl.
*H01L 25/00* (2006.01)

(52) U.S. Cl.
USPC .............................................. 326/41; 326/62

(58) Field of Classification Search
None
See application file for complete search history.

(56) References Cited

U.S. PATENT DOCUMENTS

| | | | |
|---|---|---|---|
| 6,240,521 B1 | 5/2001 | Barber et al. | |
| 7,080,341 B2 * | 7/2006 | Eisenstadt et al. | 326/81 |
| 7,884,640 B2 * | 2/2011 | Greene et al. | 326/38 |
| 8,040,151 B2 * | 10/2011 | Speers | 326/38 |
| 8,103,975 B2 * | 1/2012 | Lewis et al. | 326/38 |
| 2005/0091629 A1 * | 4/2005 | Eisenstadt et al. | 716/13 |
| 2006/0136767 A1 | 6/2006 | Ma | |
| 2007/0247189 A1 * | 10/2007 | Phil et al. | 326/41 |
| 2010/0156458 A1 * | 6/2010 | Speers | 326/39 |

* cited by examiner

*Primary Examiner* — Crystal L Hammond (57) ABSTRACT

The present application discloses an integrated circuit having a power controller that can manage power modes of a system when the system is in a low power mode. According to an embodiment, a power controller is built into an input/output (I/O) region of and integrated circuit die, wherein the I/O region is outside the main logic area of the die. The same supply voltage that powers the I/O region of the device can power the power controller. The power controller can operate to transition the integrated circuit die between power modes by transitioning logic modules of the integrated circuit between power states without intervention by the logic modules.

20 Claims, 7 Drawing Sheets

METHOD AND DEVICE FOR LOW POWER CONTROL

BACKGROUND

1. Field of the Disclosure

The present disclosure relates generally to electronic devices and more particularly to electronic devices having various power modes of operation.

2. Description of the Related Art

Many integrated circuits can operate in various power modes that are used to reduce power consumption. A central power mode controller is commonly used in integrated circuit designs to transition a device through its various power modes. The central power mode controller can be a function implemented by a CPU core of the integrated circuit, which means that software has to execute at the CPU core of the integrated circuit to transition the integrated circuit between power modes. Thus, once the CPU core has been placed in a standby state during which it cannot execute instructions, there is no way to transition the integrated circuit to a higher or lower power mode without executing a wakeup sequence that returns the CPU core to a power state that allows execution of software that is used to transition integrated circuit between power states. Typically, the lower the integrated circuit power consumption during a power mode, the longer the wakeup time associated with transitioning the integrated circuit to an operational power mode. Thus, the process of waking up a CPU core of an integrated circuit and then transitioning the integrated circuit into a different standby mode has impact on the overall performance and power consumption profile of the system.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The present application discloses an integrated circuit having a power controller that can manage power modes of a system when the system is in a low power mode. According to an embodiment, a power controller is built into an input/output (I/O) region of an integrated circuit die, wherein the I/O region is outside the main logic area of the die. The power controller can be powered by the same supply voltage as the I/O region of the die, which can be different than the supply voltage that powers other portions of the die. The power controller can operate to transition the integrated circuit die between power modes by transitioning one or more logic modules of the integrated circuit between power states without intervention by the logic modules. Various aspects of a particular embodiment will be better understood with reference to FIGS. 1-10.

Figure 1:
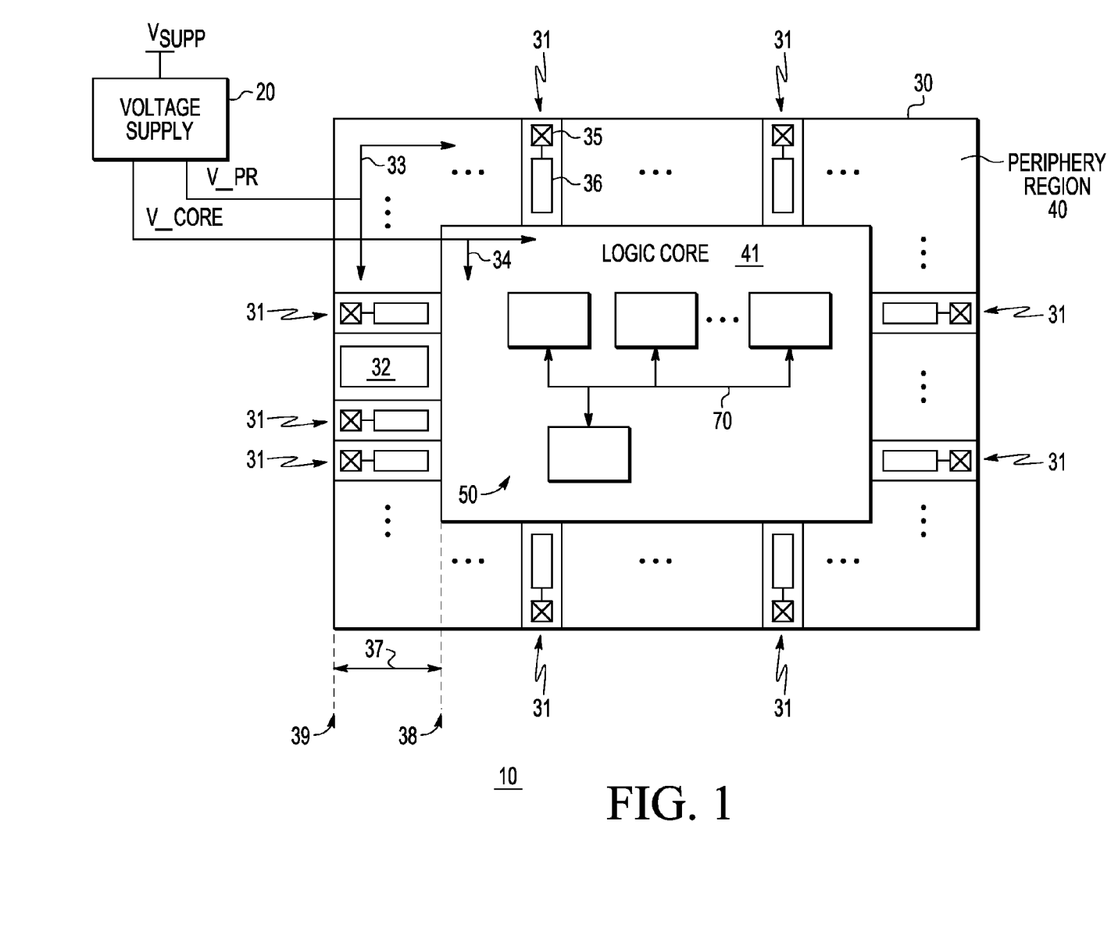
FIG. 1 illustrates, in block diagram form, a system in accordance with a particular embodiment.

FIG. 1 illustrates a portion of a system 10 that includes a voltage supply 20 connected to an integrated circuit device (IC 30) in accordance with a specific embodiment of the present disclosure. System 10 can be a portable or non-portable device. Examples of portable and non-portable devices include consumer goods, such as consumer electronics and durable consumer goods. In an embodiment, the system 10 can represent various devices, such as an automobile having an electronic engine controller, a printed circuit board having one or more integrated circuit die, a handheld computing device, a personal computer, a computer server, or components within any of these types of systems.

IC 30 is represented in a block diagram and floor-plan perspective at FIG. 1, wherein the relative location of various features of IC 30 are indicative of a physical layout relative to other features as indicated further herein. IC 30 is a semiconductor die that is defined by a common substrate, and that is capable of operating in one of a plurality of power modes. An illustrated a left most edge of the common substrate is indicated by dashed line 39. IC 30 includes a plurality of I/O pads (I/Os) 31, and a plurality of logic modules. The plurality of logic modules include the plurality of logic modules 50 and a logic module 32.

The plurality of logic modules 50 are illustrated to reside at the main logic area of IC 30, referred to herein as the logic core region 41. The plurality of I/Os 31 and the logic module 32 are illustrated to reside at the periphery region 40 of the IC 30, which is an I/O region. By virtue of having I/O pads along each edge of IC 30, the periphery region can be referred to as a padring. Each I/O pad includes a contact area 35, to which an external interconnect can be attached, and can also include an I/O buffer 36 connected to the contact area for conditioning information, e.g., digital and analog information, communicated between its I/O contact and the logic core 41. IC 30 includes an interconnect 33, which can be referred to as an "I/O power bus", that provides power to the I/Os 31. According to an embodiment, only a portion of the logic module 32 resides within the periphery regions, such as at least 25 percent of the logic module 32 or at least 50 percent of the logic module 32.

The term "interconnect" as used herein refers to various features that are used to provide signals, such as voltage or current references and digital/analog information, between various modules either directly or indirectly. For example, an interconnect can be implemented as a passive device, such as one or more conductive nodes, e.g., metal traces, that transmit information signals directly between various modules, or as an active device, whereby information being transmitted is buffered, e.g., stored and retrieved, in the processes of being communicated between devices, such as at a first-in first-out memory or other memory device. For convenience, the present disclosure may use a common reference number or label to refer to both an interconnect and to the signal transmitted by the interconnect. For example, a clock signal transmitted via an interconnect labeled CLK can be referred to herein as the CLK signal.

In the illustrated embodiment, the I/Os 31 are formed at each of the four sides of the IC 30 to define an annular region of the IC 30, e.g., the padring. Note that devices other than I/Os 31 can reside within the I/O region defined by the padring of FIG. 1. The term "annular," as used herein, is intended to mean a region of any geometric shape that is defined by an inside perimeter and an outside perimeter. Therefore, it will be appreciated that an annular region can have an inside perimeter that is a circle, a polygon, such as a rectangle or an octagon, or any other shape that has an opening in the interior. The outside perimeter of the annular region can be the same or different geometric shape as the outside perimeter of the annular region. According to one embodiment, the inner perimeter of the annular region is a distance 37 from the edge of the die 30 (dashed line 39) to an inner-most edge of an I/O pad (dashed line 38). Similarly, each side of the periphery region 40 has an I/O region that extends the distance 37 from the edge of the die 30. In other configurations I/Os are not formed at each of the four sides of the IC 30, and an annular region defined by the length of an I/O pad would not necessarily have I/O pads formed along each edge.

The voltage supply 20 receives a supply voltage labeled "Vsupp" and provides a plurality of voltage signals to the IC 30 via interconnects "V_PR" and "V_CORE". Voltage V_PR is illustrated as being provided to I/O power bus 33 of IC 30 to provide power to the I/Os 31 and to the logic module 32. The portion of the IC 30 powered by the I/O power bus 33 is referred to herein as the "I/O power domain", and can include those portions of IC 30 located at periphery region 40.

The voltage V_CORE is connected to interconnect 34 of the IC 30, referred to herein as a "logic core power bus", and provides power to the logic modules 50 at logic core 41. The portion of the IC 30 powered by the logic core power bus 34 is referred to herein as the "logic core power domain".

During operation, the IC 30 can operate in one of a plurality of power modes, wherein each one of the power modes is characterized by a different combination of power states of the logic modules 50. By way of example, it is presumed that seven power modes (PM1-PM7) are defined for IC 30 and that three power states (PS1-PS3) are defined for each logic module of the logic modules 50. A highest power mode (PM7) of IC 30 corresponds to each of the logic modules 50 being at their respective highest power states (PS3). During a next lower power mode (PM6), from full power mode, one or more of the logic modules 50 are operated at corresponding power states that are lower than PS3. Lower power states of a logic module can be implemented by reducing an operating voltage provided to the logic module, gating a power signal used by the logic module, back-biasing logic gates within a module, reducing an operating frequency of the logic module, the like, and combinations thereof. For example, the logic modules 50 can include a Central processor Unit logic module (CPU) that can be placed in a sleep state by providing a sufficiently low voltage to prevent it from executing instructions.

According to a particular embodiment, a CPU of the plurality of logic modules 50 can communicate with a power controller, which may be centralized or distributed throughout the logic core 41, to control when the logic modules 50 transition between their available power states, thereby effectuating a desired power mode of the IC 30. According to an embodiment, the CPU can communicate directly with various logic modules or with a slave power controller to provide information that is used to transition the various logic modules between power states to implement a desired power mode of IC 30.

In response to the CPU being placed in a sufficiently low power state, presumed to be sleep state or lower, the CPU cannot execute instructions and the power mode of the IC 30 cannot be modified by the CPU unless the CPU is first transitioned to a higher power state that allows it to execute instructions. However, according to an embodiment, the power mode of IC 30 can be transitioned by the logic module 32 even when the CPU is non-operational, e.g., in a sleep mode. The logic module 32 is referred to herein as the Power Mode Control module 32 (PMC 32).

In an embodiment, the PMC 32 is enabled to implement a power management plan in response to the CPU transitioning to a sufficiently low power state that prevents the CPU from implementing a power management plan. As such, it is not necessary to return the CPU to an operational power state, e.g., full power mode operation, in order to transition the IC 30 between power modes. For example, the PMC 32 can be used to transition logic modules 50 between their respective power states without intervention by a CPU of the logic region 50, eliminating the need to return the CPU to an operational state. Specific embodiments of the present disclosure will be better understood with reference to FIGS. 2-9

Figure 2:
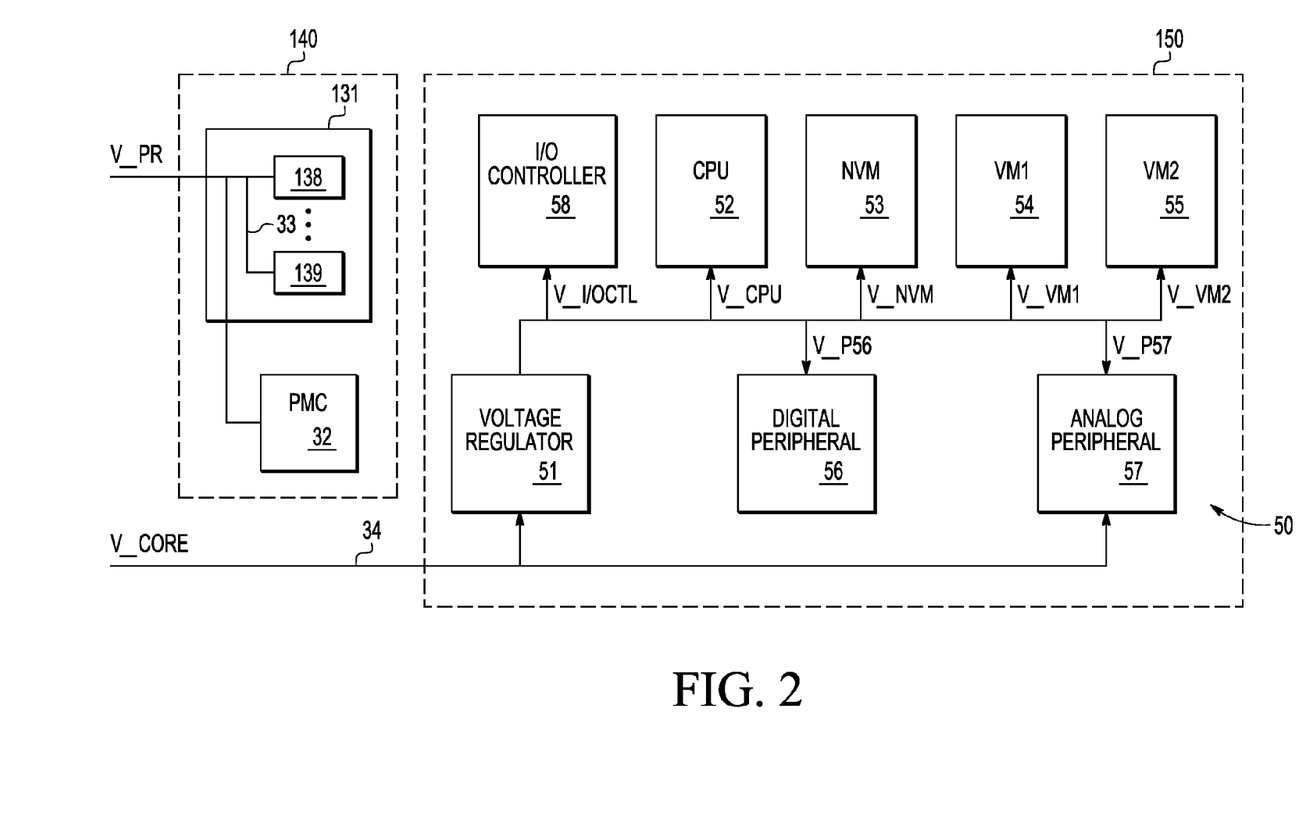
FIG. 2 illustrates, in block diagram form, a power subsystem of the integrated circuit of FIG. 1 in accordance with a particular embodiment.

FIG. 2 illustrates a particular embodiment of a power subsystem of IC 30 accordance with a specific embodiment. The plurality of logic modules 50 illustrated in FIG. 2 include: a voltage regulator module 51; a central processing unit 52 (CPU 52); a non-volatile memory module 53; a volatile memory module 54; a volatile memory module 55; a digital peripheral 56; an analog peripheral 57; and an I/O control module 58.

The power subsystem of FIG. 2 illustrates power domains including an I/O power domain 140 and a logic core power domain 150. The I/O power domain 140 includes those portions of IC 30 that are powered by the voltage V_PR, which includes the external I/Os 31 and the PMC module 32. In FIG. 2, the individual external I/Os 31 are collectively represented by a single box, and referred to, as external I/Os 131, which include segments 138-139 that represent portions of the external I/Os 131, wherein each one of the segments 138-139 can include one or more I/O pads 31 that are connected to different power nodes (V_PR1-V_PRn) of the I/O power bus 33, each of which receives the voltage V_PR via a different I/O pad (not illustrated).

The voltage V_PR received at the I/O power bus 33 can be used to directly power the external I/Os 131 and the PMC 32, or the voltage V_PR can be further regulated at the IC 30 to provide voltages needed to power to the external I/Os 131 and the PMC module 32. According to an embodiment, the voltage V_PR directly powers the external I/Os 131 and the PMC 32.

The logic core power domain 150 includes those portions of IC 30 that are powered by the voltage V_CORE, via the logic core power bus 34, which includes the plurality of logic modules 50. The voltage V_CORE can directly power the logic modules 50 or can be further regulated at the IC 30 to provide one or more regulated voltages. According to an embodiment illustrated at FIG. 2, each of the logic modules 50 is illustrated to receive one or more regulated voltage(s) from voltage regulator 51 via power interconnect 134. In particular, CPU 52 is connected to receive a voltage V_CPU, nonvolatile memory 53 is connected to receive a voltage V_NVM, volatile memory 54 is connected to receive a voltage V_VM1, volatile memory 55 is connected to receive a voltage V_VM2, the peripheral 56 receives a voltage V_P56, peripheral 57 receives a voltage V_P57, and I/O control module 58 is connected to receive voltage V_IOCTL. Note that according to an embodiment, the analog peripheral 57 can monitor the voltage V_CORE, wherein the voltage V_CORE is also is provided to the analog peripheral 57. In other embodiment, other signals, such as V_PR can be monitored by the analog peripheral 57.

Figure 3:
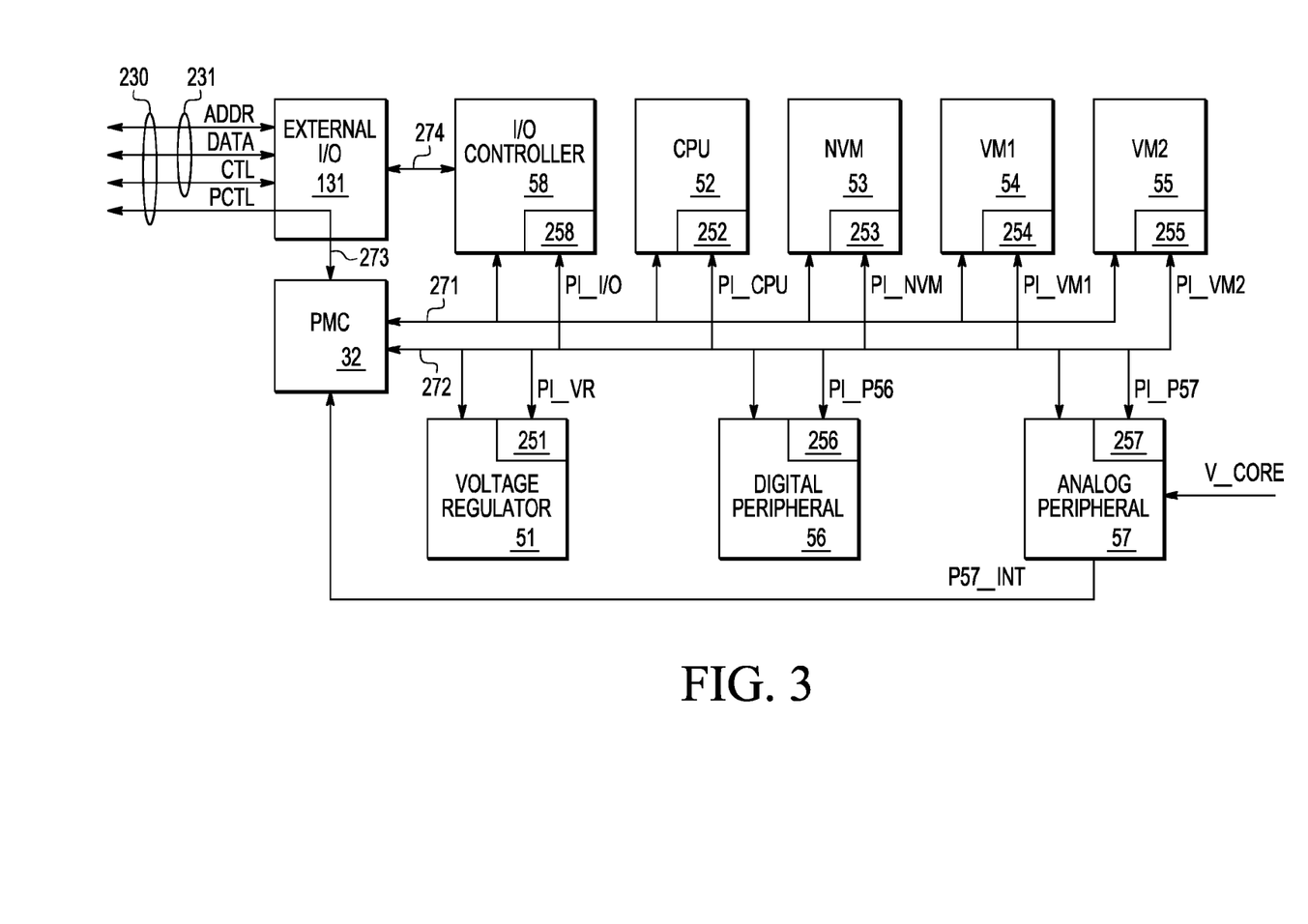
FIG. 3 illustrates, in block diagram form, a communication subsystem of the integrated circuit of FIG. 1 in accordance with a particular embodiment.

FIG. 3 illustrates a particular embodiment of a communication subsystem of IC 30 in accordance with a specific embodiment that can be implemented along with the power subsystem of FIG. 2. In addition to the modules illustrated at FIG. 2, FIG. 3 illustrates interconnects 230, and interconnects 271-274.

Interconnect 230 is an external interface of the IC 30 and includes an interconnect PCTL and an interconnect 231. Interconnect 231 is connected to portions of the external I/O module 131 to communicate information, such digital and analog information, to and from the logic modules 50 via the interconnect 274. Various digital information can include address, data and control information. Interconnect PCTL is connected to a portion of the external I/O module 131 to communicate information to and from the PMC 32 via interconnect 273.

Interconnect 271, referred to herein as "a system interconnect", is an interconnect that communicates information during normal operation amongst the logic modules to which it is connected, including internal I/O control module 58, voltage regulator 51, CPU 52, nonvolatile memory module 53, volatile memory module 54, volatile memory module 55, peripheral 56, and peripheral 57. According to an embodiment, the I/O control module 58 is master of the system interconnect 271, and each of the other modules is a slave. According to an embodiment, the CPU 52 communicates information used to transition logic modules between their available power states via the interconnect 271.

Interconnect 272, referred to herein as "a power control interconnect", is an interconnect that is used to communicate information between the power mode control module 32 and logic modules 50 in order to transition the various logic modules between power states. According to an embodiment, the power mode control module 32 is the only master of the power control interconnect 272, and each of the other modules are slaves. According to an alternate embodiment, other modules can be master of interconnect 272. For example, the power mode control module 32 or the CPU 52 can be master of the power control interconnect 272, wherein the CPU 52 can communicate information used to transition modules between their available power states via interconnect 272.

Interconnect 273 is used to communicate information between PMC 32 and external the IC 30. According to an embodiment, PMC 32 communicates external the IC 30 via the interconnect PCTL of interconnect 230. Interconnect 274 is used to communicate information between the external I/Os 131 and the I/O control module 58, e.g. via interconnect 231 of interconnect 230.

In addition to communicating over interconnects 271-274, various modules of the plurality of modules 50 can communicate with other portions of the IC 30 via other interconnects. For example, various logic modules can be capable of providing interrupt signals to the PMC 32 via a separate interconnect, such as specifically illustrated by interconnect labeled P57_INT that provides an interrupt from analog peripheral 57 to the power mode control module 32. Also illustrated as part of the communication subsystem is an interconnect that provides the voltage V_CORE to the analog peripheral 57 so that the analog peripheral can monitor a voltage level of V_CORE.

According to one embodiment, command requests are communicated via the PCTL interconnects from external the IC 30 to the PMC module 32. According to an embodiment, information received at interconnect PCTL can be provided to PMC module 32 without being provided to, or processed by, logic associated with the logic core 41. According to an embodiment, information received at interconnect PCTL can be provided to PMC module 32 without being processed by logic associated with power domain 150. It will be appreciated, that according to an alternate embodiment, PMC 32 is not connected to external I/O pads 31, and therefore does not communicate directly external IC 30.

Internal I/O control module 58 is connected to interconnect 274, power control interconnect 272, and to system interconnect 271. As indicated previously, according to an embodiment, the internal I/O control module 58 can operate as a bus master of the system interconnect 271 and of the interconnect 274. The internal I/O control module 58 can belong either to the power domain 140 or to the power domain 150. For purposes of discussion, it is presumed that the internal I/O control module 58 is a member of the power domain 150, and is capable of being placed in various power states. In various embodiments, PMC module 32 either can or cannot request servicing by the internal I/O control module 58.

Power control interconnect 272 can communicate information amongst each of the following: PMC 32; internal I/O control module 58; voltage regulator 51; CPU 52; nonvolatile memory module 53; volatile memory module 54; volatile memory module 55; digital peripheral 56; and analog peripheral 57. For purposes of discussion, it is presumed that power control interconnect 272 comprises different interconnects (PS_IO, PS_CPU, PS_NVM, PS_VM1, PS_VM2, PS_P56, and PS_P57) between the PMC 32 and each respective logic module 51-58. Note that each of the logic modules 51-58 can include respective power control ports 151-158 that represent interface and control logic through which power state transition control information is communicated and handled by the respective logic modules. Thus, power control ports 151-158 can include specific control logic, including logic that remains powered during a lowest power state, referred to as "always on" logic, which is used to facilitate transitioning its corresponding logic module between its available power states.

According to embodiment, in response to the CPU 52 being placed in a sufficiently low-power state that prevents it from implementing various power modes of the system 30, the PMC module 32 is enabled to execute a power management plan that is implemented by communicating information over the power control interconnect 272 that transitions logic modules of logic core 50 between their available power states. Thus, when CPU 52 is in a sufficiently high power mode to be operational, the CPU 52 implements a power mode control plan and provides power state control information to the logic modules 50 via one or both of the power control interconnect 272 and the system interconnect 271. In response to the CPU 52 being transitioned into a nonoperational low-power mode, a command is provided to PMC 32 to enable PMC 32 to implement a power control plan autonomous from the CPU 52. The command provided from the CPU 52 to the PMC module 32 can include an OP code, an interrupt, and the like.

Figure 4:
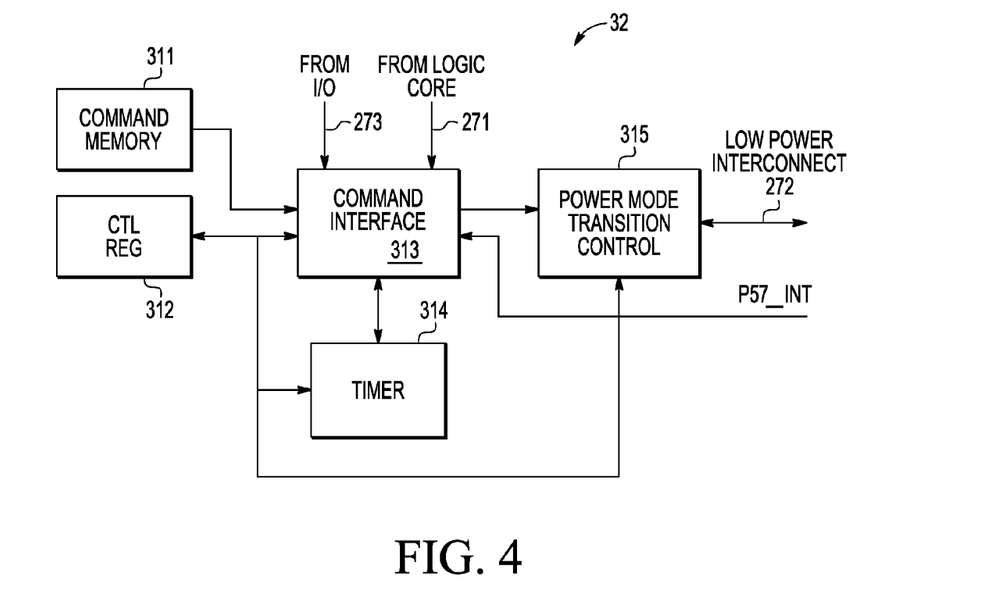
FIG. 4 illustrates, in block diagram form, a specific embodiment of a power control module of the integrated circuit of FIG. 1 in accordance with a particular embodiment.

FIG. 4 illustrates, in block diagram form, a specific embodiment of PMC 32, which includes a command interpreter 313 that is connected to each of a command memory 311, a storage module (CTL REG) 312, a timer 314, a transition control module 315, interconnect 271, interconnect 272, and interconnect 273. The storage module 312 is further connected to timer 314. The transition control module 315 is further connected to power control interconnect 272. For purposes of discussion, the storage module 312 is presumed to be a register and referred to as control register 312. The various portions of PMC 32 can be implemented by state machines, one or more instruction based data processors, and combinations thereof.

Command interpreter 313 can receive and decode commands from a variety of sources and that can be of a variety of types. For example, commands can be received from command memory 311, interconnects 271, 273, from timer 314. Commands can be in the form of OP codes, interrupts, the like, and combinations thereof. According to an embodiment, the command interpreter 313 can itself be implemented as a state machine or as an instruction-based processor that facilitates execution of various commands associated with power management as described herein.

According to an embodiment, commands executed by command interpreter 313 can include: a CALL command that is a request for the command interpreter 313 to begin execution of commands at a particular memory location, such as a memory location of command memory 311; a PSTR command that is a power state transition request to transition a particular logic module 50 from one power state to another; a PMTR command that is a power mode transition request to transition the IC 30 from one power mode to another; a DELAY command that indicates how long until a next power mode transition; an ENABLE command to enable execution of a power mode control plan by the PMC 32; a DISABLE command to disable operation execution of the power mode control plan by PMC 32; conditional commands to control which commands are executed; READ/WRITE commands, and the like.

According to an embodiment, a user can store commands at command memory 311 using a write command interpreted by the command interpreter 313, or through the use of write commands that access command memory 311 via a different read write path other than that illustrated. Command memory 311 can be integrated at: the power mode control module 32; a memory module of integrated circuit 30, such as NVM 53, the like, and combinations thereof. For purposes of discussion, it is presumed that information stored at command memory 311 resides local to the power mode control module 32, and can reside within an I/O region.

According to an embodiment, commands stored at command memory 311 include commands used to implement a power control plan that is used to control when IC 30 transitions between various power modes. For example, in response to the CPU 52 entering a sufficiently low power state, a power management plan stored at command memory 311 can be executed at PMC 32, wherein PSTR and PMTR commands of the management plan are provided to command interpreter 313 to effectuate power mode transition requests in accordance with the plan.

Figure 5:
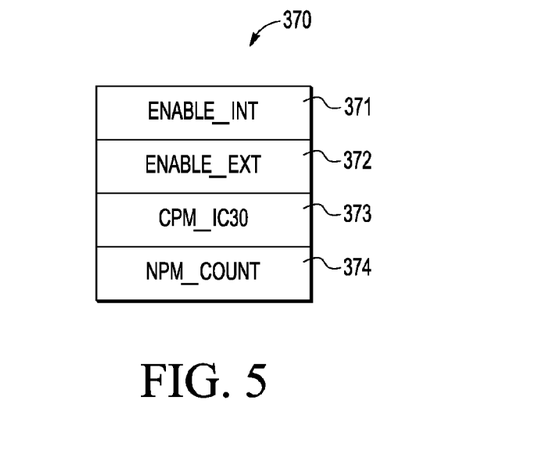
FIG. 5 illustrates, in block diagram form, storage locations storing information used in accordance with a particular embodiment.

FIG. 5 illustrates information stored at various register locations 370 of control register 312 for access by command interpreter 313 in response to interpreting and executing various commands. The register locations 370 include: a storage location 371 that stores an indicator ENABLE_INT that when asserted enables execution of a power management plan by the command PMC module 32; a storage location 372 that stores an indicator ENABLE_EXT that when asserted enables execution of commands received from external IC 30, e.g., commands received via interconnect 273; a storage location 373 that stores an indicator CPM_IC30 that indicates a current power mode of IC 30; and a storage location 374 that stores an indicator NPM_COUNT that indicates the length of a delay.

During execution of a power management plan, timer 314 can be loaded with the value NMP_COUNT to indicate when a next power mode transition is to be requested. For example, according to an embodiment, the NPM_COUNT is used to set a counter at timer 314, which when expired results in timer 314 providing a PSTR command or a PMTR command to command interpreter 313. For example, the routines stored at command memory 311 can set the value NPM_COUNT based upon a user's power plan requirements. It will be appreciated that the value NPM_COUNT can be fixed or user programmable.

According to an embodiment, a PSTR received at the command interpreter 313 includes information indicating a particular logic module to be transitioned to a different power state and whether the particular logic module is to be transitioned to a next higher or next lower next state. According to another embodiment, a PSTR can indicate the particular logic module to be transitioned and an indication of a target power state that the particular logic module is to be transitioned to. Note that in this embodiment, the target power state may or may not be the next higher or lower power state. For purposes of discussion, it is presumed that the PSTR command indicates a particular logic module and whether it should be transitioned to a next higher or lower power state. It will be appreciated that PSTR commands need not be implemented in an embodiment of IC 30.

In response to receiving a PSTR command to transition a particular logic module between power states, the command interpreter 313 will access the indicator CPM_IC30 from register 371 to determine the current power mode of IC 30, which corresponds to a particular power state of the logic module to be transitioned. The command interpreter 313 will then provide transition control information to the transition control module 315 (a state transition request) indicating the desired logic module state transition to be implemented. In response to receiving a state transition request, the transition control module 315 provides control information, e.g., a set of signal transitions meeting particular timing requirements, over the power control interconnect 272 to one or more of the logic module 50 to implement the requested power state transition. In the embodiment being described, the target power state is presumed to be either the next higher or lower power state, thus only information identifying the particular logic module being transition, its current or target power state, and an indicator that indicates whether the logic module is transitioning to a higher or lower power state is needed to be provided to the transition control module 315.

In response to the command interpreter 313 receiving a PMTR command to transition the IC 30 between power states, the command interpreter 313 will access the indicator CPM_IC30 from register 371 to determine the current power mode of IC 30 and will provide information to the transition control module 315 (a power mode transition request) indicating the desired power mode transition to be implemented. In response, the transition control module 315 provides control information, e.g., a set of signal transitions meeting particular timing requirements over the power control interconnect 272 to one or more logic modules 50 to implement the requested power mode transition. A PMTR can result in one or more multiple logic modules of the logic modules 50 changing power states. In the embodiment being described, a PMTR can request a target power mode that is either the next higher or lower power mode, thus only information identifying the current or target power mode, and whether the IC 30 is being transitioned to a next higher or lower power state needs to be provided to the transition control module 315. It will be appreciated that in other embodiments additional information may need to be provided; for example, additional information may be needed to transition the IC 30 to a target power mode that is not a next higher or lower power mode. Transition control module 315 will be better understood with reference to FIGS. 6 and 7.

Figure 6:
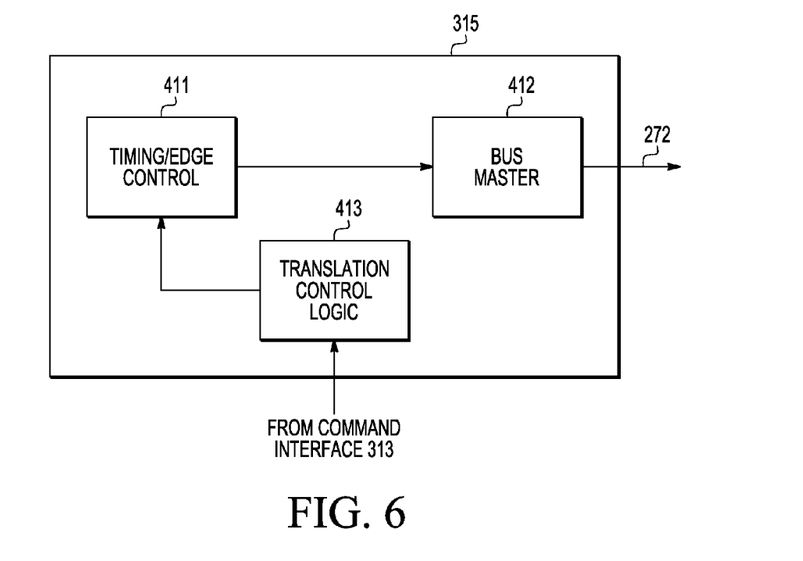
FIG. 6 illustrates, in block diagram form, a specific embodiment of a portion of the power control module of FIG. 4 in accordance with a particular embodiment.

FIG. 6 illustrates a particular embodiment of the transition control module 315 that includes a timing/edge control module 411, a bus master 412, and translation control module 413. According to an embodiment, the state of each of each logic module 50 during a given power mode can be fixed by design or user programmable, e.g., defined by a user. By way of discussion, it is presumed that each one of the power modes PM1-PM7 is fixed by design. As such, the translation control logic 413 stores information identifying the signal transitions, and their relationships to each other, that need to be provided via the power interconnect 272 to the logic modules 50 to implement a desired power mode transition between power modes. This information can be stored in tabular form that can be fixed or user programmable. Upon interpreting control information from interpreter 313, translation control logic 413 provides signal and timing information to the timing/edge control logic 411 that indicates the various signal state and timing information to be communicated to one or more logic modules of the logic core via interconnect 271 to effectuate the desired power mode transition. Based upon the information received from translation control logic 413, the timing/edge control logic 411 determines when to provide access requests to the bus master module 412 to assure appropriate time intervals between individual signal transitions used to transition the logic module 50 between logic state. In one embodiment, the PMC 32 operates based upon a clock having a very low clock rate, such as 32 kHz. However, in order to transition between power modes more quickly, and to accommodate timing constraints between transitioning signals that can be imposed by the logic modules, the very low frequency can be multiplied, e.g., by a PLL of edge control module 411, to generate a sufficiently fast clock.

The translation logic module 315 can be a state machine or instruction based processor that implements specific timing and control information that is used to effectuate a requested power state transition of the logic module or a requested power mode transition of the IC 30, without the need to first transition the CPU 52 to a higher power mode, e.g., without transitioning CPU 52 from a non-operational power mode to an operational power mode. A defined power mode transition can affect states of one or more logic modules as will be described in greater detail with reference to FIG. 7.

Figure 7:
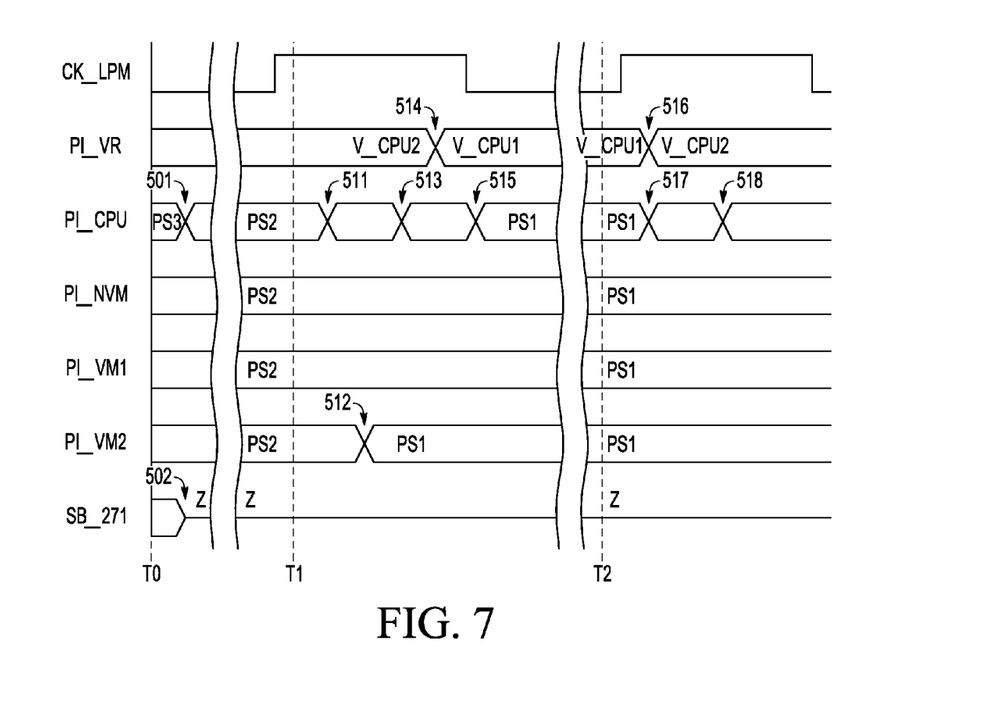
FIG. 7 illustrates, a timing diagram associated with the integrated circuit of FIG. 1 in accordance with a particular embodiment.

FIG. 7 illustrates a timing diagram that includes a clock signal labeled CK_LPM that is received at PMC 32, various signals transmitted from PMC 32 via low power interconnect 272, including: PI_PR; PI_CPU; PI_NVM; VI_VM1; PI_P1; and signal information at system bys 271, labeled SI_271. The transitions of FIG. 7 are referred to in the plural, e.g., transitions 501, transitions 502, etc., because each transition illustrated at FIG. 7 can represent one or more signals transitioning at one or more individual interconnects, and at one or more times.

CK_LPM represents the very low-frequency clock that is provided to PMC 32, which has a very low clock rate relative a system clock of the IC 30. The clock CK_LPM can be multiplied to a higher frequency (not shown) in order to facilitate the various other transitions illustrated at FIG. 7, or to implement requested power mode transitions faster.

Signal PI_VR represents one or more individual control signals provided from the power mode control module 32, via the interconnect PI_VR, that are used to set one or more of the signals, e.g., voltages, that are provided from the voltage regulator 51 to various logic modules 52-57. Signal PI_CPU represents one or more individual control signals provided from the PMC module 32, via the interconnect PI_CPU, that are used to transition the CPU 52 between power states. Signal PI_NVM represents one or more individual control signals provided from the power mode control module 32, via the interconnect PI_NVM, that are used to transition the NVM 53 between power states. Signal PI_VM1 represents one or more individual control signals provided from the PMC module 32, via the interconnect PI_VM1, that are used to transition the virtual memory module 54 between power states. Signal PI_P56 represents one or more individual control signals provided from the PMC module 32, via interconnect PI_P56, that are used to transition the peripheral module 56 between power states. Signal SI_271 represents one or more individual signals provided from PMC 32, via system interconnect 271, that are used to communicate information between logic modules. It will be appreciated that the transitions illustrated at FIG. 3 can occur over a period of time as needed to implement a specific operation as described.

Immediately prior to time T0 of the timing diagram of FIG. 7, the IC 30 is in a sufficiently high power mode, presumed to be PM6, whereby the CPU 52 is at its highest power state (PS3), and, therefore, is operational and responsible for implementing a power control plan by communicating with other logic modules to manage power modes of the IC 30. At time T0 execution of a transition request, which can be a PSTR or a PMTR, is begun at CPU 52 that transitions the CPU 52 from the power state PS3 to a next lower power state PS2. Transitions 501 represent an enable command received at command interpreter 313 that indicates the PMC 32 is to execute its own power management plan. Note that while the transitions 501 are illustrated at interconnect PI_CPU of interconnect 271, in other embodiments, the enable command can be provided via an alternate interconnect, such as via an interrupt signal provided directly from CPU 52 to PMC 32 (not shown). In response to transitions 501, the command interpreter 313 will access control register 312 to assert ENABLE_INT, which enables PMC 32 to execute a power management plan, and the CPU 52 places itself into a next lower power state (PS2) from which it can no longer communicate over system bus 271. The inability of CPU 52 to communicate via bus 271 is indicated by signal SB_271 transitioning to a high-impedance state (Z).

In response to being enabled by transitions 501, a power mode management plan is implemented by the PMC 32. For example, asserting the indicator ENABLE_INT can result in a routine stored at command memory 311 being executed by the command interpreter 313. As part of the power management plan, for example, the accessed commands can load the timer 314 with the value NPM_COUNT to indicate how long until a next power mode transition is to occur. When the timer expires, the timer 314 will send a PMTR request to interpreter 313, all without intervention by the CPU 52. Note that the transition to be requested by the timer 314 can be fixed, e.g., always request a next lower power mode, or user programmable.

Immediately prior to time T1, the IC 30 is in a power mode PM5, which is between the highest power mode (PM7) and the lowest power mode (PM1). By way of example, it is presumed that each of the logic modules having signals illustrated at FIG. 7 is at their middle power state (PS2) during power mode PM5. Note that in the power mode PM5 that the CPU 52 is at a sufficiently low power mode that prevents it from transitioning itself or other logic modules between power states.

At time T1, the command interpreter 313 has received a PMTR request to transition the IC 30 to a next lower power mode, e.g., from PM5 to power mode PM4. For example, the requested transition to power mode PM4 can be provided to the command interpreter 313 from the timer 314, in response to a specified amount of time having elapsed at timer 314. In response, the command interpreter 313 determines the current power state of IC 30 by accessing storage location CPM_IC30 of control register 312. Based upon this information, the command interpreter 313 determines a desired power mode transition, and provides control information, e.g., transition request information, to the transition control module 315 indicating the desired power mode transition.

Upon interpreting transition request information from interpreter 313, translation control logic 413 provides signal and timing information to the timing/edge control logic 411 that indicates the various signal state and timing information to be communicated to one or more logic modules of the logic core via interconnect 271 to effectuate the desired power mode transition from PM5 to PM4. Based upon the information received from translation control logic 413, the timing/edge control logic 411 determines when to provide access requests to the bus master module 412 to assure appropriate time intervals between individual signal transitions used to transition the logic module 50 between logic state. Transitions 511 through 515 of FIG. 7 represent signal transitions that transition the IC 30 from power mode PM5 to power mode PM4.

By way of example, power mode PM5 varies from the power mode PM4 in the following manner: CPU 52 is in power state PS1 instead of power state PS2; voltage regulator 51 provides a voltage V_CPU1 to CPU 52 instead of voltage V_CPU2; and peripheral 56 is in power mode PM1 instead of PM2. Therefore, as described in greater detail below, the transitions 511-515 represent the signal changes needed to transition IC 30 from power mode PM1 to power mode PM2.

Signal PI_CPU includes signal transitions 511, 513, and 515 that are used to transition CPU 52 from power state PS2 to power state PS1. Signal PI_P61 includes signal transitions 512 that are used to transition the peripheral 56 from power state PS2 to power mode PS1. Signal PI_VR includes signal transitions 514 that are used to transition the voltage provided to the CPU 52 from voltage V_CPU2 to a lower voltage V_CPU1.

According to a particular embodiment, system requirements of IC 30 can be such that certain transitions need to occur in a certain sequence relative to other transitions. For example, the voltage provided to the CPU 52 may need to remain at voltage CPU2 until after certain initial state changes at CPU 52 that are implemented by transitions 511,513, but prior to certain other state changes at CPU 52 implemented by transitions 515. Thus, FIG. 7 illustrates the signal transitions 514, which change the voltage provided CPU 52 from CPU2 to CPU1, occurring after transitions 513 and prior to transitions 515. Signal transitions 512, which place the peripheral 56 in a lowest power state (P51), are shown to occur between transition 511 and 513. As a result of transitions 511-515 the IC is transitioned from power mode PM5 to PM4 without having to transition CPU 52 to a higher power mode.

Prior to time T2, the IC 30 is in a lowest power mode (PM1), and at time T2 the command interpreter 313 has received a PMTR request to transition the IC 30 to a next higher power mode, e.g., from PM1 to power mode PM2. In response, the command interpreter 313 determines the current power state by accessing storage location CPM_IC30 of control register 312, and provides control information to the transition control module 315 indicating the desired transition from PM1 to PM2. Signal transitions 516 through 518 of FIG. 7 represent information being transmitted to various logic modules of the logic core 41 to transition the IC 30 from power mode PM1 to PM2. By way of example, power mode PM2 varies from the power mode PM1 in the following manner: CPU 52 is in power state PS2 instead of power state PS1.

PMC 32 provides signal transitions 517 and 518 to CPU 52 via interconnect PI_CPU to transition IC 30 from power state PS1 to power state PS2. PMC 32 also provides signal transitions 516 that are used to transition the voltage provided to the CPU 52 from voltage V_CPU1 to voltage regulator 51 via interconnect PI_VR to provide a higher voltage (V_CPU2) to the CPU 52. According to a particular embodiment, system requirements of IC 30 can be such that transitions 516-518 need to occur in a particular sequence. For example, the voltage V_CPU2 may need to be provided to the CPU 52 prior to certain state changes at CPU 52 implemented by transitions 518. Thus, FIG. 7 illustrates the signal transitions 516, which change the voltage provided to CPU 52, occurring prior to transitions 518. Note that the transitions 516 may or may not have particular timing requirements with respect to the transitions 217, and are illustrated at FIG. 7 as being contemporaneous with the transitions 217.

Figure 8:
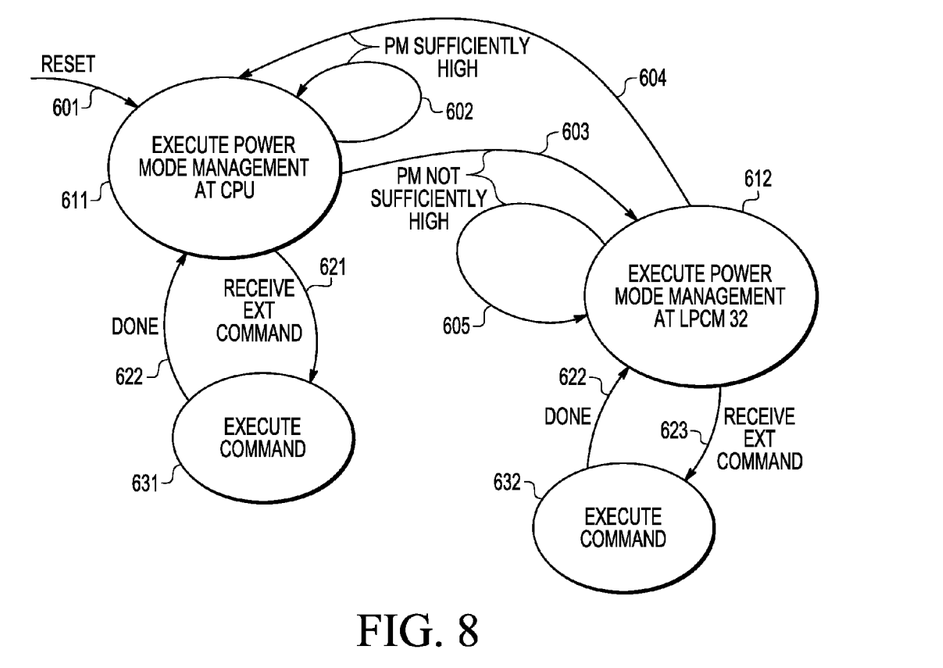
FIG. 8 illustrates, a state diagram associated with the integrated circuit of FIG. 1 in accordance with a particular embodiment.

FIG. 8 represents a state diagram associated with IC 30. The state diagram includes a state node 611 that represents a state of the IC 30 during which power mode management is controlled by the CPU 52, and a state node 612 during which power mode management is controlled by PMC 32.

Upon reset, such as during startup, the IC 30 transitions via state transition 601 to state node 611 by virtue of the IC 30 being placed in a power mode that includes CPU 52 having an operational power state. At state node 611, the CPU is responsible for executing a desired power mode transition plan. Thus, so long as the power mode of integrated circuit 30 remains sufficiently high, and in particular, so long as the power state of CPU 52 remains sufficiently high to execute the power mode transition plan, the IC 30 will remain in state node 611 as indicated by state transition 602, and will implement a management power plan. However, the IC 30 will transition to state node 612, as indicated by state transition 603, in response to the CPU 52 transitioning to a power mode that is not sufficiently high to allow execution of the power mode management plan by CPU 52.

While operating at state node 612, the PMC 32 is responsible for implementing a power mode management plan in a manner that is autonomous from the CPU 52. The power management plan executed by PMC 32 may be the same or different as the power management plan implemented by CPU 52 at state node 611. According to an embodiment, one of a plurality of specific management plans can be identified for execution by the PMC 32 prior to CPU 52 completing its transition to a non-operative state. For example, a particular memory location can be identified by the CPU 52 that indicates to the PMC 32 where a power management plan to be implemented resides.

The PMC 32 continues to implement its power mode management plan as indicated by the state transition 605 so long as power mode transitions are not sufficiently high to place the CPU 52 in an operational power state. Otherwise, in response to the PMC 32 transitioning the IC 30 to a power mode that places the CPU 52 in an operational power state, the IC 30 will return to state node 611, via state transition 604, and the power mode management plan is implemented by CPU 52, and the value ENABLE_INT 371 is disabled to stop execution of the power management plan by PMC 32.

According to embodiment, the PMC 32 can interpret and execute commands received from external locations when the power management plan is being executed at PMC 32 or when the power management plan being executed at CPU 52. Referring to FIG. 8, in response to receiving an external command while operating in state 611, the IC 30 transitions via state transition 621 to state node 631, wherein the external command is executed by the PMC 32. The IC 30 returns to state node 611 the estate transition 622, after executing the command, and the power mode management plan implemented by CPU 52 continues. Note it will be appreciated, that transitioning to node 631 to execute an external command does not necessarily require the power mode management plan being executed at CPU 52 to be halted. Similarly, in response to receiving an external command while IC 30 is operating at state 612, PMC 32 transitions via state transition 623 to state node 632, wherein the external command is executed by the PMC 32. Upon completion, operation of IC 30 returns to state node 612, wherein the power mode management plan being executed by PMC 32 continues.

According to an embodiment, the analog peripheral 57 monitors an external voltage, such as V_CORE as illustrated at FIG. 3, to determine whether to send an interrupt (P57_INT) to the PMC 32 based upon the detected voltage. For example, in response to being in a lowest power mode of operation, the voltage V_CORE can be at a reduced voltage that does not support full power operation of IC 30, wherein upon detecting that V_CORE has returned to a power level that support a higher power mode of operation, the analog peripheral 57 will assert an interrupt, e.g., signal P57_INT, which is interpreted as a PMTR command by PMC 32 to transition the IC 30 to a higher power mode, such as full power mode.

Figure 9:
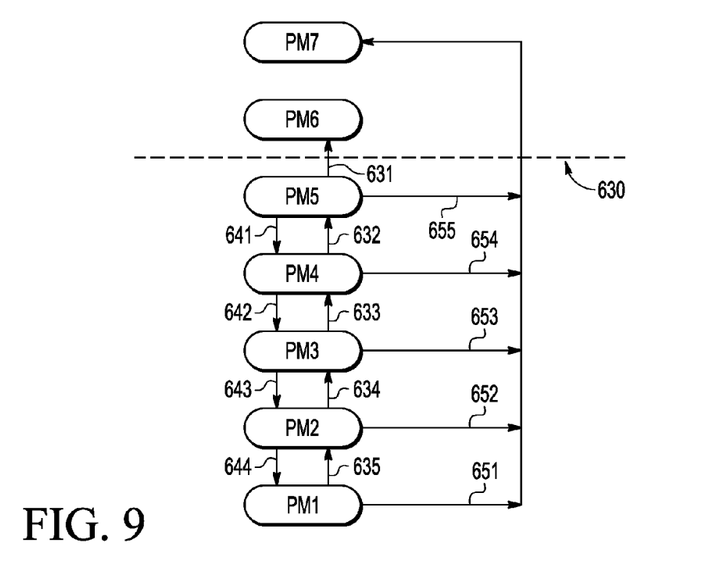
FIG. 9 illustrates, a diagram illustrated power mode transition associated with the integrated circuit of FIG. 1 in accordance with a particular embodiment.
Figure 10:
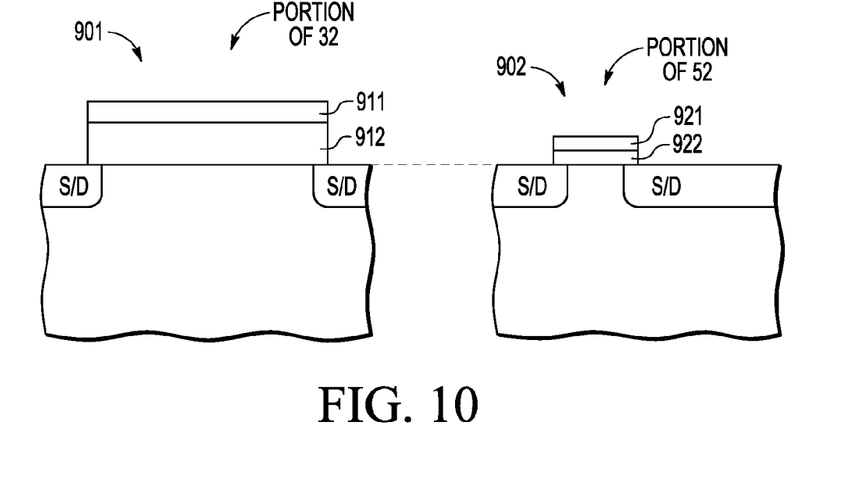
FIG. 10 illustrates a cross-section view of transistors associated with the integrated circuit of FIG. 1 in accordance with a particular embodiment.

FIG. 9 graphically illustrates each of the power modes PM1-PM7 of the IC 30 and a demarcation line 630. The power modes PM6 and PM7 are above the demarcation line 630 and the power modes PM1-PM5 are below the demarcation line 630. The power modes above the demarcation line 630 are power modes of the IC 30 during which the CPU 52 is in a sufficiently high power state to execute a power management plan, e.g., CPU 52 is operational, while the power modes below the demarcation line 630 are power modes of the IC 30 during which the CPU 52 is not in a sufficiently high power state to execute a power management plan. Therefore, the PMC 32 is responsible for executing the power management plan at IC 30 during power modes PM1-PM5.

Arrows 631-635, 641-644, and 651-655 at FIG. 9 represent power mode transitions that can be implemented by the management plan of the PMC 32 according to an embodiment. In particular, the management plan of the PMC 32 is capable of transitioning the IC 30 from a current power mode to full power mode PM7 from any power mode, as indicated by arrows 651-654, or from a current power mode to an immediately adjacent target power mode, as indicated by arrows 631-634 and arrows 641-643, so long as the CPU 52 is not operational in the current power mode. According to an embodiment, the only transitions that can be implemented by PMC 32 include transitions to immediately adjacent power modes. According to another embodiment, the only transitions that can be implemented by PMC 32 include transitions to immediately adjacent power modes and transitions to a highest power mode. According to an embodiment, the only transitions that can be implemented by PMC 32 include transitions to immediately adjacent power modes, and state transitions for individual modules. It will be appreciated that in another embodiment, the PMC 32 can be capable of implementing additional transitions between power modes that are not immediately adjacent. For example, the PMC 32 can be capable of transitioning from any one of PM2-PM5 to a lowest power mode (PM1). According to an embodiment, all power mode transitions that can be implemented by PMC 32 are implemented by the command interpreter 313 implementing a sequence of separate state transitions for one or more logic modules.

It will be appreciated, that in an embodiment, that the power mode control module 32 can process requests to transition the IC 30 even when the CPU 52 is in an operational mode. For example, PMC 32 can execute transition request specifically requested by an external resource via interconnect 273, so long as the value at register ENABLE_EXT is asserted. Alternatively, in response to the value ENABLE_EXT being negated, the PMC 32 is not be enabled to process external requests to transition the IC 30 when the CPU 52 is in a nonoperational mode, instead such requests would need to be made directly to the CPU 52. In yet another embodiment, the low-power control module can transfer any received external requests to transition the IC 30 to the CPU 52 when the CPU 52 is operational in response to ENABLE_EXT being asserted.

According to an embodiment, to reduce static power (leakage power) transistors used to implement logic at PMC 32 have a thicker gate oxide then transistors used to implement logic at the logic modules 50. For example, referring to FIG. 10, a transistor 901 represents a transistor at PMC 32, and includes a gate electrode 911 and a gate dielectric 912; and a transistor 902 represents a transistor at CPU 52, and includes a gate electrode 921 and a gate dielectric 922. The gate dielectric 912 is thicker than gate dielectric 922. For example, the gate dielectric 912 can have a thickness that is 2 to 15 times greater than that of gate dielectric 922, such as approximately three times greater. According to an embodiment, gate dielectric 912 has a thickness of greater than 30 nm, such as in a range of 30-200 nm, while the gate dielectric 922 has a thickness of less than 20, such as in a rage of 15 to 20 nm. In addition, the gate width of transistor 901 can be larger than the gate width of transistor 902. For example, the gate width of transistor 902 can be 2 to 5 times longer, such as approximately three times longer.

In a first aspect, a device can include a logic core of an integrated circuit (IC) die comprising a plurality of logic modules including a first logic module, the first logic module to operate in one of a plurality of indicated power states including a first power state and a second power state. The device can also include a periphery region of the IC die defined by a plurality of I/O pads abutting an edge of the IC die, wherein the plurality of I/O pads of the IC die are to provide a signal interface between the plurality of logic modules and external the IC die, and a power control module, residing within the periphery region, to control transition the first logic module between the plurality of power states, including from the first power state to the second power state.

In one embodiment of the first aspect, the device is to enable the power control module to implement a power control plan that manages power states of the first and second logic modules in response to the first logic module transitioning to a power state that is not sufficiently high. In another embodiment, the first logic module is a data processor core that is to execute instructions. In a particular embodiment, the plurality of logic modules further includes a second logic module to operate in one of a plurality of indicated power states including a first power state and a second power state and the first logic module, when in a sufficiently high power state, is to control transitioning the second logic module from the second logic module's first power state to its second power state, otherwise, when the first logic module is not in the sufficiently high power state, the first logic module cannot control transitioning the second logic module from the second logic module's first power state to its second power state. In another particular embodiment, the power control module is to control transitioning the second logic module from the second logic module's first power state to its second power state, autonomous of the first logic module, when the first logic module is not in the sufficiently high power state.

In a further embodiment of the first aspect, the power control module cannot control transitioning the second logic module from the second logic module's first power state to its second power state when the first logic module is in the sufficiently high power state. In another embodiment, the power control module can control transitioning the second logic module from the second logic module's first power state to its second power state when the first logic module is in the sufficiently high power state. In an even further embodiment, the first logic module is a data processor core that is to execute instructions only when in a sufficiently high power state of the plurality power states, and neither the first power state nor the second power state of the data processor core are sufficiently high power states. In still another embodiment, the first logic module is a data processor core that is to execute instructions only when in a sufficiently high power state of the plurality power states, the first logic module's first power state is not a sufficiently high power state, and the first logic module's second power state is a sufficiently high power state.

In another embodiment of the first aspect, the first logic module is execute a first power management plan for the IC die in response to the first power state being a sufficiently high power state, otherwise, in response to the first power state not being a sufficiently high power state, the power control module is to implement a second power management plan for the IC die to transition the plurality of logic modules between their respective power states autonomous of the first logic module. In a further embodiment, the second power management plan is user programmable. In particular embodiment, the power mode control module includes a storage region to store the second power management plan, the storage regions within the periphery regions. In an even more particular embodiment, the power mode control module is further to execute a command received from external the IC die via at least one I/O pad of the plurality of I/O pads.

In a further embodiment of the first aspect, the logic core further includes a second logic module, and the power control module is further to transition the first logic module between first logic module's power states in response to receiving an interrupt indicator from the second logic module. In another embodiment, the power control module is further to transition the first logic module in response to receiving an interrupt indicator from an I/O port of the plurality of I/O pads. In still another embodiment, a system interconnect coupled to the plurality of logic modules to communicate information between the plurality of logic modules, and a power control interconnect coupled to the plurality of logic modules and to the power mode control module, the power control interconnect module to communicate information from the power mode control module to the plurality of logic modules to transition the IC die between a plurality of power modes.

In a particular embodiment of the first aspect, transistors of the logic module have a thinner gate dielectric than transistors of the power control module. In an even more particular embodiment, a logic core power bus, that is to provide power to the first logic module, to receive a first logic supply voltage from external the IC die, and an I/O power bus, that is to provide power to the plurality of I/O pads and to the power control module, to receive an I/O supply voltage from external the IC die. In a further embodiment, a voltage regulator at the integrated circuit die to receive a first supply signal from external the integrated circuit die and to generate one or more regulated supply signals to be provided to the plurality of logic modules via a logic core power bus, including a first regulated supply signal to be provided to the first logic module, and an I/O power bus to receive a second supply signal from external the IC die and to provide the second supply signal to the plurality of I/O pads and to the power control module.

In a second aspect, a method can include executing a first power management plan at a power mode control module that is substantially disposed at an I/O region of an integrated circuit die, and in response to executing the first power management plan, providing information from the power mode control module to transition a first set of one or more logic modules disposed within a logic core of the IC die between respective logic states to implement a first indicated power mode of the IC die.

In one embodiment of the second aspect, the I/O region includes a periphery region that is within a first distance of an edge of the I/C die, the first distance equal to a height of an I/O pad that borders the first edge. In another embodiment, executing the first power management plan includes the power mode control module executing a plurality of instructions stored within the I/O region. In still another embodiment, executing the first power management plan includes the power mode control module executing a plurality of instructions stored within the logic core.

In another embodiment of the second aspect, prior to executing the first power management plan, executing a second power management plan at a first logic module of the one or more logic modules, in response to executing the second power management plan, providing information from the first logic module to transition the first set of one or more logic modules between respective power states, to implement a second indicated power mode of the IC die, and wherein executing the first power management plan is in response to execution of the second power management plan enabling the power mode control module to execute the first power management plan.

In a third aspect, a method can include providing a voltage to a plurality of input/output (IO) pads at an I/O region of an integrated circuit die, and to a power mode control module at the I/O region, providing a logic core power supply signal to a plurality of logic modules of a logic region of the integrated circuit die to provide power to the plurality of logic modules, and receiving a command at the power mode control module, and in response to receiving the command, providing control information from the power mode control module to the first logic module to transition the first logic module to a different power mode.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, according to an embodiment where it is desirable to reduce the size of the PMC 32, only a defined set of PMTR transitions are supported. Therefore, in an embodiment the PMC 32 need not support PSTR commands. In other embodiments, such as embodiments where it would be desirable for a resource external the IC 30 to have a greater level of power mode control, the PMC 32 can support PSTR commands enabling greater flexibility to the external resource. Thus it will be appreciated that the power management plan implemented by PMC 32 can transition the IC 30 between the same or different set of power modes and states as can the CPU. Alternatively, the PMC 32 can transition the IC 30 between a subset of the power modes supported by the CPU. Also, while the PMC 32 has been described as maintaining transition information relating to power modes at the translation control logic 413, in another embodiment, the translation control logic 413 can include only information related to timing needed to execute PSTRs, which transition individual logic modules between their power states, and the command interpreter 313 is responsible for effectively executing multiple PSTR commands sequentially to effectuate a PMTR request logic mode changes of IC 30. In another example, the PMC 32 need not be connected to the system interconnect 271. For example, instead of command interpreter 313 communicating information via the system interconnect 271, the command interpreter 313 can communicate through the low-power interconnect 272, by writing information to the control register 312, which can be accessed via the system interconnect 271, and the like.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A device comprising:
   a logic core of an integrated circuit (IC) die comprising a plurality of logic modules including a first logic module, the first logic module to operate in one of a plurality of indicated power states including a first power state and a second power state;
   a periphery region of the IC die defined by a plurality of I/O pads abutting an edge of the IC die, wherein the plurality of I/O pads of the IC die are to provide a signal interface between the plurality of logic modules and external the IC die; and
   a power control module, residing within the periphery region, to control transition the first logic module between the plurality of power states, including from the first power state to the second power state.

2. The device of claim 1, wherein the device is to enable the power control module to implement a power control plan that manages power states of the first and second logic modules in response to the first logic module transitioning to a power state that is not sufficiently high.

3. The device of claim 1, wherein the first logic module is a data processor core that is to execute instructions.

4. The device of claim 1, wherein the plurality of logic modules further comprises a second logic module to operate in one of a plurality of indicated power states including a first power state and a second power state; and
   the first logic module, when in a sufficiently high power state, is to control transitioning the second logic module from the second logic module's first power state to its second power state, otherwise, when the first logic module is not in the sufficiently high power state, the first logic module cannot control transitioning the second logic module from the second logic module's first power state to its second power state; and
   the power control module is to control transitioning the second logic module from the second logic module's first power state to its second power state, autonomous of the first logic module, when the first logic module is not in the sufficiently high power state.

5. The device of claim 4, wherein the power control module cannot control transitioning the second logic module from the second logic module's first power state to its second power state when the first logic module is in the sufficiently high power state.

6. The device of claim 4, wherein the power control module can control transitioning the second logic module from the second logic module's first power state to its second power state when the first logic module is in the sufficiently high power state.

7. The device of claim 1, wherein the first logic module is a data processor core that is to execute instructions only when in a sufficiently high power state of the plurality power states, and neither the first power state nor the second power state of the data processor core are sufficiently high power states.

8. The device of claim 1, wherein the first logic module is a data processor core that is to execute instructions only when in a sufficiently high power state of the plurality power states, the first logic module's first power state is not a sufficiently high power state, and the first logic module's second power state is a sufficiently high power state.

9. The device of claim 1, wherein the first logic module is execute a first power management plan for the IC die in response to the first power state being a sufficiently high power state, otherwise, in response to the first power state not being a sufficiently high power state, the power control module is to implement a second power management plan for the IC die to transition the plurality of logic modules between their respective power states autonomous of the first logic module.

10. The device of claim 9, wherein the second power management plan is user programmable.

11. The device of claim 10, wherein the power mode control module includes a storage region to store the second power management plan, the storage regions within the periphery regions.

12. The device of claim 1, wherein the logic core further comprises a second logic module, and the power control module is further to transition the first logic module between first logic module's power states in response to receiving an interrupt indicator from the second logic module.

13. The device of claim 1, wherein the power control module is further to transition the first logic module in response to receiving an interrupt indicator from an I/O port of the plurality of I/O pads.

14. The device of claim 1 further comprising:
   a system interconnect coupled to the plurality of logic modules to communicate information between the plurality of logic modules; and a power control interconnect coupled to the plurality of logic modules and to the power mode control module, the power control interconnect module to communicate information from the power mode control module to the plurality of logic modules to transition the IC die between a plurality of power modes.

15. The device of claim 1 further comprising:

a logic core power bus, that is to provide power to the first logic module, to receive a first logic supply voltage from external the IC die; and an I/O power bus, that is to provide power to the plurality of I/O pads and to the power control module, to receive an I/O supply voltage from external the IC die.

16. A method comprising:

executing a first power management plan at a power mode control module that is substantially disposed at an I/O region of an integrated circuit die; and in response to executing the first power management plan, providing information from the power mode control module to transition a first set of one or more logic modules disposed within a logic core of the IC die between respective logic states to implement a first indicated power mode of the IC die.

17. The method of claim 16, wherein the I/O region includes a periphery region that is within a first distance of an edge of the I/C die, the first distance equal to a height of an I/O pad that borders the first edge.

18. The method of claim 17, wherein executing the first power management plan includes the power mode control module executing a plurality of instructions stored within the I/O region.

19. The method of claim 16, further comprising prior to executing the first power management plan, executing a second power management plan at a first logic module of the one or more logic modules;

in response to executing the second power management plan, providing information from the first logic module to transition the first set of one or more logic modules between respective power states, to implement a second indicated power mode of the IC die; and wherein executing the first power management plan is in response to execution of the second power management plan enabling the power mode control module to execute the first power management plan.

20. A method comprising:

providing a voltage to a plurality of input/output (IO) pads at an I/O region of an integrated circuit die, and to a power mode control module at the I/O region;

providing a logic core power supply signal to a plurality of logic modules of a logic region of the integrated circuit die to provide power to the plurality of logic modules; and receiving a command at the power mode control module, and in response to receiving the command, providing control information from the power mode control module to the first logic module to transition the first logic module to a different power mode.

\* \* \* \* \*